(12) United States Patent
Pirri et al.

(10) Patent No.: US 11,292,154 B2
(45) Date of Patent: Apr. 5, 2022

(54) DRIVE APPARATUS OF A MOBILE OPERATING MACHINE AND MOBILE OPERATING MACHINE COMPRISING SAID DRIVE APPARATUS

(71) Applicant: CIFA S.P.A., Senago (IT)

(72) Inventors: Nicola Pirri, Milan (IT); Emanuele Zorzi, Cesano Maderno (IT)

(73) Assignee: CIFA S.P.A.

( * ) Notice: Subject to any disclaimer, the term of this patent is extended or adjusted under 35 U.S.C. 154(b) by 279 days.

(21) Appl. No.: 16/458,519

(22) Filed: Jul. 1, 2019

(65) Prior Publication Data
US 2020/0001500 A1    Jan. 2, 2020

(30) Foreign Application Priority Data

Jul. 2, 2018    (IT) .......................... 102018000006841

(51) Int. Cl.
*B28C 5/42*    (2006.01)

(52) U.S. Cl.
CPC .......... *B28C 5/4258* (2013.01); *B28C 5/4213* (2013.01); *B28C 5/4248* (2013.01)

(58) Field of Classification Search
CPC ... B28C 5/4258; B28C 5/4248; B28C 5/4213; Y02T 10/70; Y02T 10/62; Y02P 90/60; B60L 2200/40; B60L 7/10; B60L 1/003; B60L 50/61; E04G 21/0445; E04G 21/0436; E04G 21/02
See application file for complete search history.

(56) References Cited

U.S. PATENT DOCUMENTS

| | | | | |
|---|---|---|---|---|
| 8,616,758 B2* | 12/2013 | Takahashi | ............. | B28C 5/4213 366/61 |
| 9,346,186 B2* | 5/2016 | Takahashi | ............. | B28C 5/4213 |
| 9,481,106 B2* | 11/2016 | Takahashi | ............. | B28C 5/4213 |
| 9,551,385 B2* | 1/2017 | Takahashi | ............. | B28C 5/4213 |
| 9,694,683 B2* | 7/2017 | Takahashi | ............. | B28C 5/4213 |
| 9,726,276 B2* | 8/2017 | Takahashi | ........... | F16H 61/4139 |
| 10,829,946 B2* | 11/2020 | Zorzi | ..................... | B60L 1/003 |
| 2013/0111892 A1* | 5/2013 | Takahashi | ............. | B28C 5/4213 60/459 |
| 2013/0276577 A1* | 10/2013 | Kroschel | ............... | B28C 5/4213 74/665 B |
| 2014/0015315 A1* | 1/2014 | Takahashi | ............. | B28C 5/4213 307/10.1 |
| 2015/0306786 A1* | 10/2015 | Pirri | ........................ | B28C 5/421 366/60 |
| 2016/0199999 A1* | 7/2016 | Pirri | ........................ | B28C 5/421 366/60 |

(Continued)

FOREIGN PATENT DOCUMENTS

JP    2003301802 A  * 10/2003 ............. B28C 5/422

*Primary Examiner* — Charles Cooley
(74) *Attorney, Agent, or Firm* — BakerHostetler

(57) ABSTRACT

A drive apparatus for a mobile operating machine, comprising at least one internal combustion motor, an articulated arm to deliver concrete and a pumping unit to pump the concrete from the drum to the articulated arm. The drive apparatus comprises hydraulic pumps configured to pump a working fluid and to determine the drive of the pumping unit and of the articulated arm. The apparatus also comprises at least one electromechanical machine connected to the internal combustion motor, to the hydraulic pumps, and to an electric accumulator.

8 Claims, 4 Drawing Sheets

(56) References Cited

U.S. PATENT DOCUMENTS

| | | | |
|---|---|---|---|
| 2016/0250774 A1* | 9/2016 | Takahashi | F02D 29/04 |
| | | | 366/61 |
| 2017/0080600 A1* | 3/2017 | Dickerman | B28C 5/422 |
| 2020/0001500 A1* | 1/2020 | Pirri | B28C 5/4213 |
| 2020/0002961 A1* | 1/2020 | Zorzi | B60K 25/00 |

* cited by examiner

DRIVE APPARATUS OF A MOBILE OPERATING MACHINE AND MOBILE OPERATING MACHINE COMPRISING SAID DRIVE APPARATUS

CROSS REFERENCE TO RELATED APPLICATIONS

This application claims priority under 35 U.S.C. § 119 from Italian Patent Application No. 102018000006841, filed Jul. 2, 2018 with the Italian Patents and Trademarks Office, Italy, the contents of which are incorporated herein by reference.

TECHNICAL FIELD

The present invention concerns a drive apparatus of a mobile operating machine, such as a concrete mixer pump truck, a truck-mounted pump or suchlike. The present invention also concerns a mobile operating machine comprising the drive apparatus.

BACKGROUND

The use of mobile operating machines, such as concrete mixer pump trucks, truck-mounted pumps, or suchlike, generally consisting of a motor vehicle on which one or more apparatuses or work units are positioned, is known.

Concrete mixer pump trucks, for example, are used to transport, mix and distribute concrete from a production plant to the location of the construction site where the concrete is used. These concrete mixer pump trucks are provided with at least a rotatable drum to mix the concrete, at least an articulated arm to distribute or deliver the concrete and at least a unit to pump the concrete from the drum to the articulated arm.

Truck-mounted pumps receive the concrete to be pumped or delivered from one or more external concrete mixer pump trucks and a pumping unit, of the truck-mounted pump, pumps the concrete toward the articulated arm.

The articulated arm is provided with a pipe that extends for the entire length of the articulated arm and the concrete is pumped through this pipe toward the terminal end of the articulated arm itself.

If the mobile operating machine is a concrete mixer pump truck, both during the loading step in the production plant, and also during the step of transport it to the construction site, the concrete must be kept malleable, and therefore the rotatable drum, which contains the concrete, must be kept in constant rotation to prevent it from drying and hardening.

Furthermore, on arrival at the construction site, the concrete mixer pump truck sometimes has to wait its turn for the unloading step. During this step too, the drum must be kept in constant rotation.

Before the step of pumping the concrete through the articulated arm and therefore before the final distribution step, the concrete undergoes a homogenization step, in which the drum of the concrete mixer pump truck is made to rotate at the maximum rotation speed.

During the step when the concrete passes toward the pumping unit and therefore toward the articulated arm, the rotatable drum is rotated in the direction opposite the mixing direction.

In known concrete mixer pump trucks, the rotation of the drum normally happens by means of a hydraulic motor driven by fluid-dynamic pumps commanded by an internal combustion motor which is usually a diesel motor. The internal combustion motor can be the one that drives the motor vehicle or an auxiliary motor independent of that of the vehicle on which it is mounted.

The drive of the unit pumping the concrete from the drum to the articulated arm is also normally commanded by this internal combustion motor, both in concrete mixer pump trucks and also in truck-mounted pumps. In the case of concrete mixer pump trucks, as we said, the rotatable drum is mounted directly on the mobile operating machine, while in the case of truck-mounted pumps, the rotatable drum is mounted on a separate motor vehicle, for example a concrete mixer truck which is placed alongside the truck-mounted pump to unload the concrete.

The articulated arm, both in concrete mixer pump trucks and also in truck-mounted pumps, is normally provided with a plurality of sections, or segments, reciprocally articulated, and is provided with a series of hydraulic actuators or motors that allow the rotation of one section with respect to the other. The hydraulic motors are fed by other fluid-dynamic pumps which are also commanded by the internal combustion motor.

The fluid-dynamic pumps that feed a working fluid for the hydraulic motors or actuators of the articulated arm possibly also allow to drive the unit pumping the concrete. The fluid-dynamic pumps therefore require dedicated drive members and devices, which are generally very bulky, and therefore require suitable installation spaces on board the motor vehicle.

Known mobile operating machines, due to this disposition of the fluid-dynamic pumps and of the corresponding drive and motion transmission members, often have rather excessive sizes, in particular the longitudinal bulk of the machine is often very large, with obvious limits to the practicality and flexibility of use for the end user, both in the case of concrete mixer pump trucks and also in the case of truck-mounted pumps.

It would therefore be desirable for mobile operating machines, although provided with fluid-dynamic pumps associated at least with the articulated arm and with the concrete pumping unit, to have smaller bulk and sizes, greater flexibility of use and, overall, greater efficiency.

EP 2.784.229 and EP 3.023.212 respectively show a mechanical digger and a vehicle for spraying concrete in tunnels in which at least parts of the components have electric drives.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore the need to perfect a drive apparatus of a mobile operating machine which can overcome at least one of the disadvantages of the state of the art.

One purpose of the present invention is to provide a drive apparatus of a mobile operating machine which, advantageously, allows to substantially reduce the overall sizes of the mobile operating machine, in particular to reduce its longitudinal bulk, with undoubted advantages in terms of operational effectiveness and flexibility of use.

Another purpose of the present invention is to provide a drive apparatus of a mobile operating machine which allows, in a compact and efficient manner, to selectively move the hydraulic pumps required for the operation of the mobile operating machine, such as the hydraulic pumps to supply working fluid to the drive means of the concrete pumping unit and/or the articulated arm.

Another purpose of the present invention is to provide a drive apparatus of a mobile operating machine which allows the mobile operating machine to possibly operate in a hybrid manner, that is, which is efficient and versatile for the different modes of use for which the machine is intended.

In particular, it is also a purpose of the present invention to allow the drive of at least some of the operating components of the operating machine without the aid of the internal combustion motor of the mobile operating machine.

A further purpose of the present invention is to provide a mobile operating machine provided with a high degree of autonomy and flexibility of operation, in particular a possible hybrid operation.

Another purpose of the present invention is to provide a mobile operating machine which allows to reduce fuel consumption, for example diesel fuel, and to reduce the corresponding emissions, for example of carbon dioxide and of particulate, thus avoiding problems of cost and environmental pollution.

A further purpose is to obtain noise reduction and health protection for the people who are near the mobile operating machine, including the workers on the construction site affected by its presence.

The Applicant has devised, tested and embodied the present invention to overcome the shortcomings of the state of the art and to obtain these and other purposes and advantages.

SUMMARY

The present invention is set forth and characterized in the independent claims, while the dependent claims describe other characteristics of the invention or variants to the main inventive idea.

In accordance with the above purposes, one object of the invention is a drive apparatus of a mobile operating machine, comprising a motor vehicle moved by at least one internal combustion motor, an articulated arm able to deliver concrete and a pumping unit configured to pump the concrete to the articulated arm.

According to one aspect of the invention, the drive apparatus comprises:
- at least a hydraulic pump configured to pump a working fluid and to determine the drive of the pumping unit and at least a hydraulic pump configured to pump a working fluid and determine the drive of the articulated arm;
- at least an electromechanical machine connected to the internal combustion motor, to the hydraulic pumps and to an electric accumulator and configured to assume at least a first operating condition in which it converts the mechanical energy of the internal combustion motor into electric energy to be accumulated in the electric accumulator, and a second operating condition in which it converts the electric energy of the electric accumulator into mechanical energy to drive at least one of the hydraulic pumps;
- at least a first drive axis along which the internal combustion motor and the electromechanical machine are positioned; and
- at least a second drive axis, adjacent and connected to the first drive axis by means of a transmission device, the hydraulic pumps being positioned on the second drive axis.

Advantageously, thanks to the provision of the two adjacent drive axes, the present drive apparatus of a mobile operating machine allows to substantially reduce the overall sizes of the mobile operating machine, in particular reduce its length, with undoubted advantages in terms of operational effectiveness and flexibility of use.

The present drive apparatus therefore allows, in a compact and efficient manner, to selectively move at least one of the hydraulic pumps required for the operation of the mobile operating machine, such as the hydraulic pumps to supply working fluid to the drive means of the concrete pumping unit and/or of the articulated arm.

The drive apparatus comprises at least another hydraulic pump configured to pump a working fluid and determine the drive of a rotatable concrete mixing drum and installed on the motor vehicle; the other hydraulic pump is positioned on the first drive axis along which the internal combustion motor and the electromechanical machine are positioned.

The drive axes can be parallel and the transmission device can be positioned along a vertical axis.

The transmission device can comprise an activation member configured to selectively transmit the motion from the first drive axis to the second drive axis.

The drive apparatus can comprise a containing body in which the transmission device can be positioned and in which at least a first rotation shaft associated with the first drive axis and at least a second rotation shaft associated with the second drive axis can be at least partly positioned.

The internal combustion motor can comprise a drive shaft connectable to the first rotation shaft by means of an elastic joint.

The first rotation shaft can be located in axis with the drive shaft, furthermore, the other hydraulic pump and the electromechanical machine can be connected in axis on the first rotation shaft.

The drive apparatus can comprise at least one free wheel, or overrunning joint, positioned on the first drive axis and configured to allow the transmission of the motion of the internal combustion motor to the electromechanical machine and to prevent the transmission of the mechanical energy generated by the electromechanical machine toward the internal combustion motor when the latter is switched off, or when the internal combustion motor is in operation jointly with the electromechanical machine and they cooperate to supply power to the hydraulic pumps.

An auxiliary hydraulic pump can be positioned on the first drive axis, in axis with the other hydraulic pump configured to pump a working fluid and determine the drive of the rotatable drum.

The second pumping device and the third pumping device can be positioned on the second drive axis A further object of the invention is a concrete mixer pump truck to transport, mix and pump concrete, comprising a motor vehicle moved by at least one internal combustion motor, an articulated arm able to deliver concrete and a pumping unit configured to pump the concrete to the articulated arm, and a drive apparatus substantially as defined above.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF ILLUSTRATIVE EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
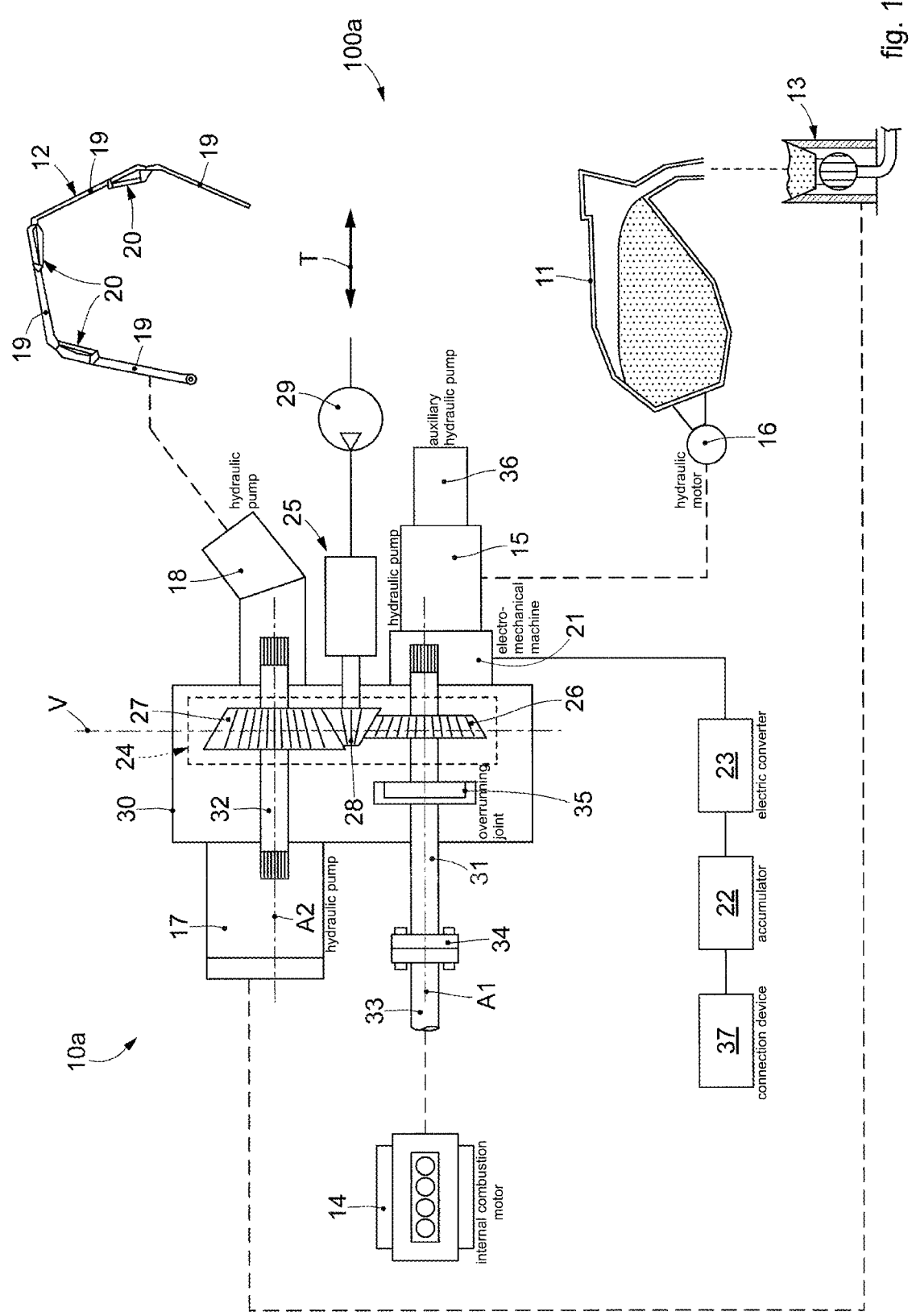
FIG. 1 is a schematic view of a drive apparatus of a first mobile operating machine according to the present invention.

With reference to the attached drawings and in particular FIG. 1 thereof, a drive apparatus 10a according to the invention is configured to drive the main operating units of a mobile operating machine 100a.

In FIG. 1, by way of non-restrictive example, the mobile operating machine 100a is a concrete mixer pump truck to transport, mix and pump concrete, therefore the main operating units moved by the drive apparatus 10a are a rotatable drum 11 to mix the concrete, an articulated arm 12 able to deliver concrete and a pumping unit 13 configured to pump the concrete from the drum 11 to the articulated arm 12.

The concrete mixer pump truck 100a will also comprise a motor vehicle moved by means of at least one internal combustion motor 14, for example a diesel engine or suchlike.

At least the drum 11, the articulated arm 12 and the pumping unit 13 are installed on the motor vehicle.

The drive apparatus 10a comprises a first hydraulic pump 15, configured to pump the working fluid and determine the drive of the drum 11.

In particular, the hydraulic pump 15 is able to supply working fluid to a hydraulic motor 16 that rotates the drum 11 in one direction or the other.

The drive apparatus 10a also comprises a second hydraulic pump 17, configured to pump working fluid and determine the drive of the pumping unit 13, that is, of the unit suitable to transfer the concrete produced and mixed by the drum 11 toward the articulated arm 12 for final distribution or delivery.

Furthermore, the drive apparatus 10a comprises a third hydraulic pump 18, configured to pump working fluid and determine the drive of the articulated arm 12.

In particular, the articulated arm 12 comprises a plurality of reciprocally articulated sections 19, so that the articulated arm 12 can assume the desired position. The reciprocal movement of the sections 19 is carried out by hydraulic actuators 20 to which the hydraulic pump 18 supplies working fluid.

The drive apparatus 10a also comprises an electromechanical machine 21 connected to the internal combustion motor 14, to the hydraulic pumps 15, 17, 18 and to an electric accumulator 22.

An electronic converter 23, in particular an inverter, is positioned between the electromechanical machine 21 and the electric accumulator 22.

The electric accumulator 22 can be provided with a connection device 37 configured to connect the electric accumulator 22 to an electric power source, for example a normal electric network.

The electromechanical machine 21 can function as a generator or as an electric motor, therefore it is configured to assume at least a first operating condition in which it converts the mechanical energy of the internal combustion motor 14 into electric energy to be accumulated in the electric accumulator 22, and a second operating condition in which it converts the electric energy of the electric accumulator 22 into mechanical energy to drive at least one hydraulic pump 15, 17, 18.

The drive apparatus 10a comprises at least a first drive axis A1 along which the internal combustion motor 14, the electromechanical machine 21 and at least one of the hydraulic pumps 15, 17, 18, for example the hydraulic pump 15, are positioned.

The drive apparatus 10a is also provided with at least a second drive axis A2, adjacent and connected to the first drive axis A1 by means of a transmission device 24, and at least a pair of the hydraulic pumps 15, 17, 18, for example the hydraulic pumps 17, 18, are positioned on the second drive axis A2.

In particular, the drive axes A1 and A2 can be parallel and the transmission device 24 can be positioned along a vertical axis V.

The transmission device 24 can comprise an activation member 25, configured to selectively transmit the motion from the first drive axis A1 to the second drive axis A2.

The transmission device 24 can comprise for example a pair of conical gears 26 and 27 which can lie substantially along the vertical axis V and which are normally separated.

The activation member 25 can comprise another conical gear 28 suitable to allow the transmission of the motion from the conical gear 26 to the conical gear 27, therefore from the first drive axis A1 to the second drive axis A2.

This activation member 25 can be activated or deactivated for example by means of translation T in one direction or the other by means of a corresponding movement device 29, for example a pneumatic device.

The drive apparatus 10a can comprise a containing body 30 in which the transmission device 24 is positioned and in which at least a first rotation shaft 31 associated with the first drive axis A1 and at least a second rotation shaft 32 associated with the second drive axis A2 are at least partly positioned.

The internal combustion motor 14 comprises a drive shaft 33 which is connected to the first rotation shaft 31 by means of suitable connection means, in particular an elastic joint 34.

This first rotation shaft 31, in particular, is located in axis with the drive shaft 33, and at least one hydraulic pump 15, 17, 18 and the electromechanical machine 21 are keyed onto the first rotation shaft 31.

The drive apparatus 10a can comprise at least one free wheel, or overrunning joint 35, positioned on the first drive axis A1 and configured to allow the transmission of the motion of the internal combustion motor 14 to at least one hydraulic pump 15, 17, 18 positioned on the drive axis A1 and also to the electromechanical machine 21, and to also prevent the transmission of the mechanical energy generated by the electromechanical machine 21 toward the internal combustion motor 14.

The overrunning joint 35 is integrated in the drive apparatus 10a in order to allow to manage the torque entering and/or exiting into/from the transmission device 24 without generating imbalances in the internal combustion motor 14 of the motor vehicle, that is, without altering the behavior of the internal combustion motor 14.

The overrunning joint 35 is therefore able to decouple the motion coming from the internal combustion motor 14 from that of the electromechanical machine 21.

This overrunning joint 35 inhibits any possibility of supplying power to the drive shaft 33 of the internal combustion motor 14. The electromechanical machine 21, thanks to the overrunning joint 35, is in fact only able to draw power from the internal combustion motor 14, or to cooperate with it in order to supply energy to the hydraulic pumps 15, 17, 18.

The overrunning joint 35 can be positioned inside the containing body 30 in order to guarantee a certain degree of protection and to optimize yields; this positioning also allows to use the same lubricating oil of the transmission device 24 without the need to provide dedicated external circuits with undeniable energy losses.

However, for greater ease of access, the overrunning joint 35 could also be keyed onto a segment of the first rotation shaft 31 outside the containing body 30.

In some embodiments, the first hydraulic pump 15 configured to pump a working fluid and determine the drive of the drum 11 can be positioned on the first drive axis A1.

The fact that the hydraulic pump 15 is provided definitively associated with the drum 11 axially connected to the electromechanical machine 21, that is, on the drive axis A1, allows to maximize the energy efficiency, since by doing so, we avoid introducing, inside the kinematic chain dedicated to this drive, an efficiency that is certainly lower than one deriving from a mechanical reduction stage. It is preferable to connect the hydraulic pump 15 in axis with the electromechanical machine 21 since the movement of the drum 11 is, in general, the longest step for the mobile operating machine 100a, and therefore using the solution described above allows to optimize energy saving.

Furthermore, another auxiliary hydraulic pump 36 can also be connected on the first drive axis A1, for example a hydraulic pump to wash the various components of the mobile operating machine 100a or other.

The second hydraulic pump 17 and the third hydraulic pump 18 are positioned on the second drive axis A2.

It is preferable to mount the hydraulic pump 17 associated with the pumping unit 13 and the hydraulic pump 18 associated with the articulated arm 12 on the same drive axis A2, due to the simultaneity of the two types of drives; during the operation of the pumping unit 13 the movement of the articulated arm 12 is also allowed, and therefore it is necessary for the two hydraulic pumps 17 and 18 to be mounted on the same drive axis, that is, the drive axis A2.

Figure 2:
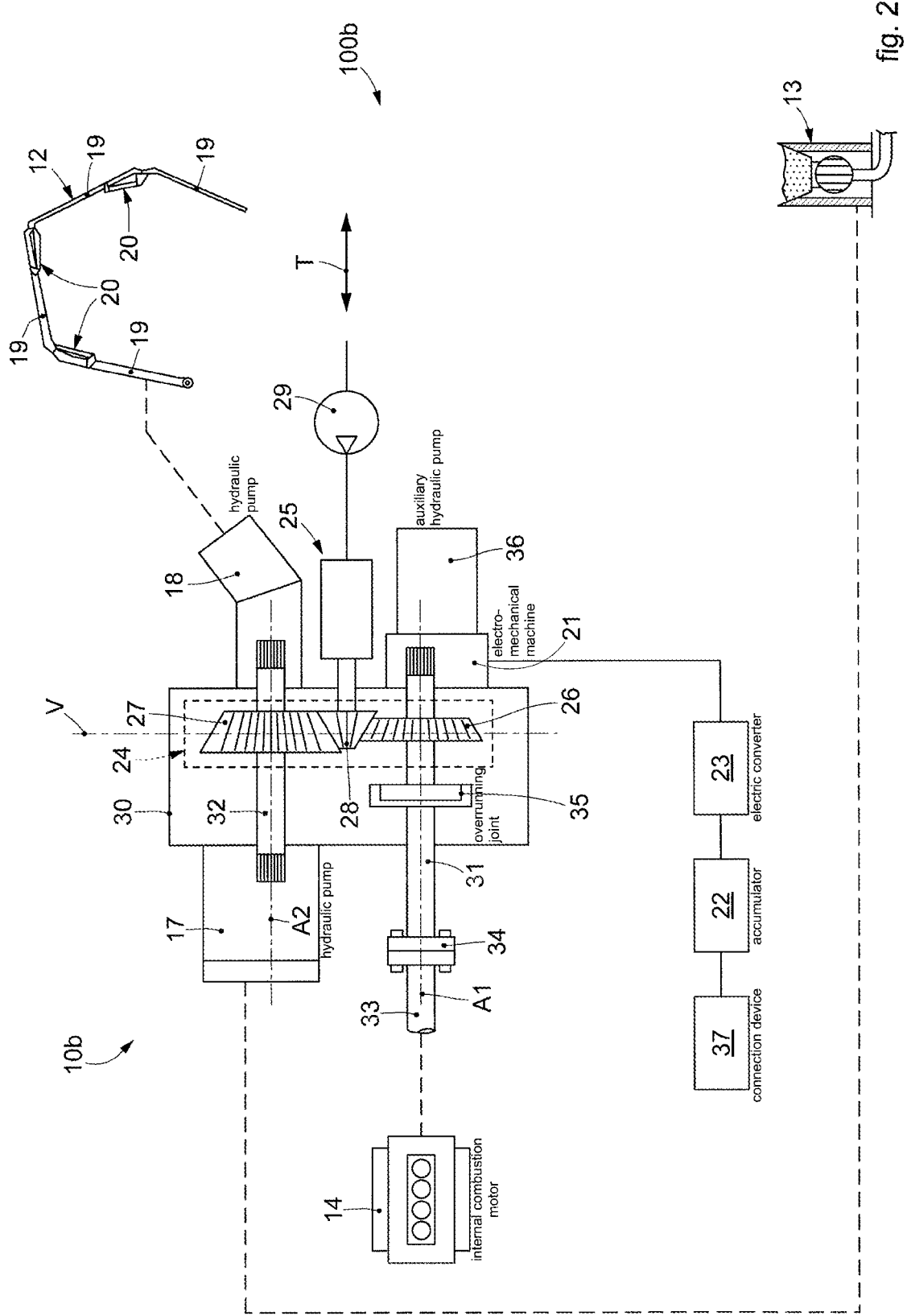
FIG. 2 is a schematic view of the present drive apparatus of a second mobile operating machine.

FIG. 2 shows a further variant of the present mobile operating machine 100b, that is, substantially a truck-mounted pump, therefore provided with the articulated arm 12 and the pumping unit 13 able to transfer the concrete toward the articulated arm 12.

The concrete, in this case, is unloaded by one or more drums that are outside the mobile operating machine 100b, therefore for example concrete mixer trucks interacting in a manner known per se with the mobile operating machine 100b to supply it with concrete. The external drums provide to unload the concrete into the pumping unit 13 of the mobile operating machine 100b so that it is subsequently transferred through the articulated arm 12.

The drive apparatus 10b is completely similar to the drive apparatus 10a, except for the fact that it is not equipped with the hydraulic pump 15.

By means of the present drive apparatus 10a or 10b it is possible to ensure the present mobile operating machine 100a or 100b has a series of operating modes, which are shown in FIGS. 3, 4, 5 and 6 by means of arrows highlighted with a greater thickness and which are referred, by way of a non-limiting example, to the mobile operating machine 100a, that is, the concrete mixer pump truck.

Figure 3:
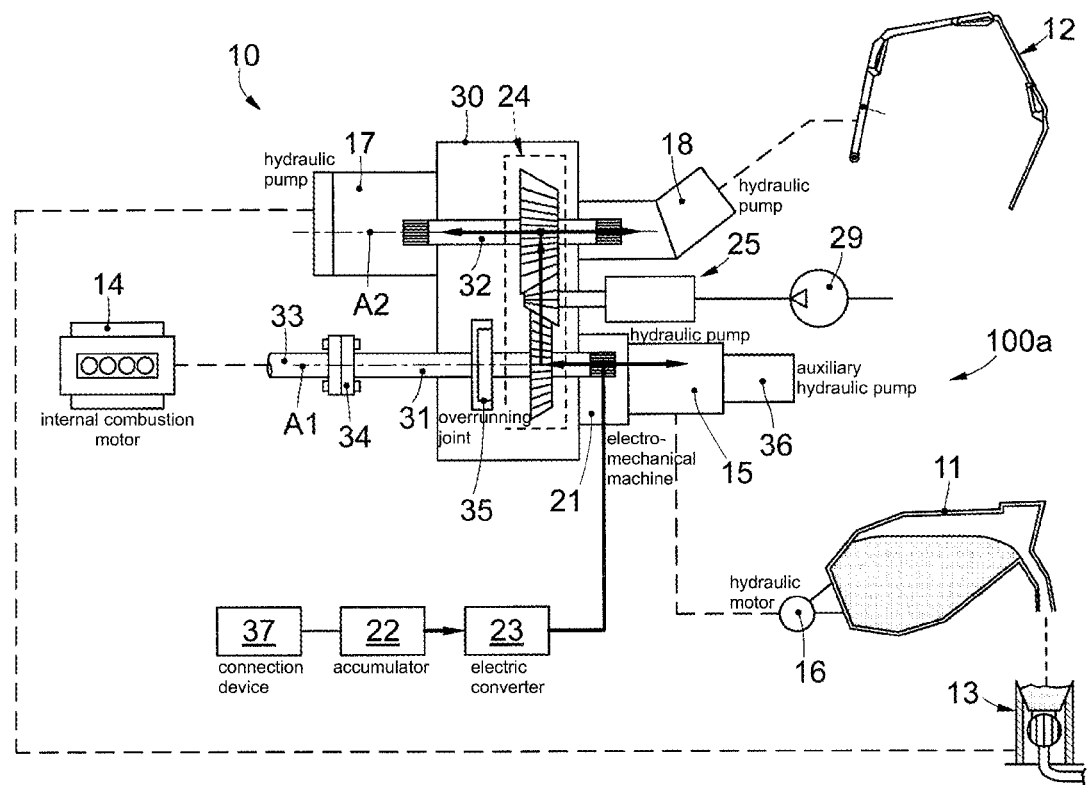
FIG. 3 is a schematic view of a first electric operating mode of the mobile operating machine, for example the first mobile operating machine, which comprises the present drive apparatus.

FIG. 3 shows a first operating mode of the present mobile operating machine 100a which is purely electric, that is, all the power can be taken from the electric accumulator 22 and transferred, thanks to the electromechanical machine 21, which in this case acts as a motor, to the drive apparatus 10a on which the hydraulic pumps 15, 17, 18 and possibly 36 are mechanically mounted.

Additional electric power can be supplied to the electromechanical machine 21 and/or to the electric accumulator 22 also by means of connection to the connection device 37 and to the external source of electric energy, both in direct current and also in alternating current.

Figure 4:
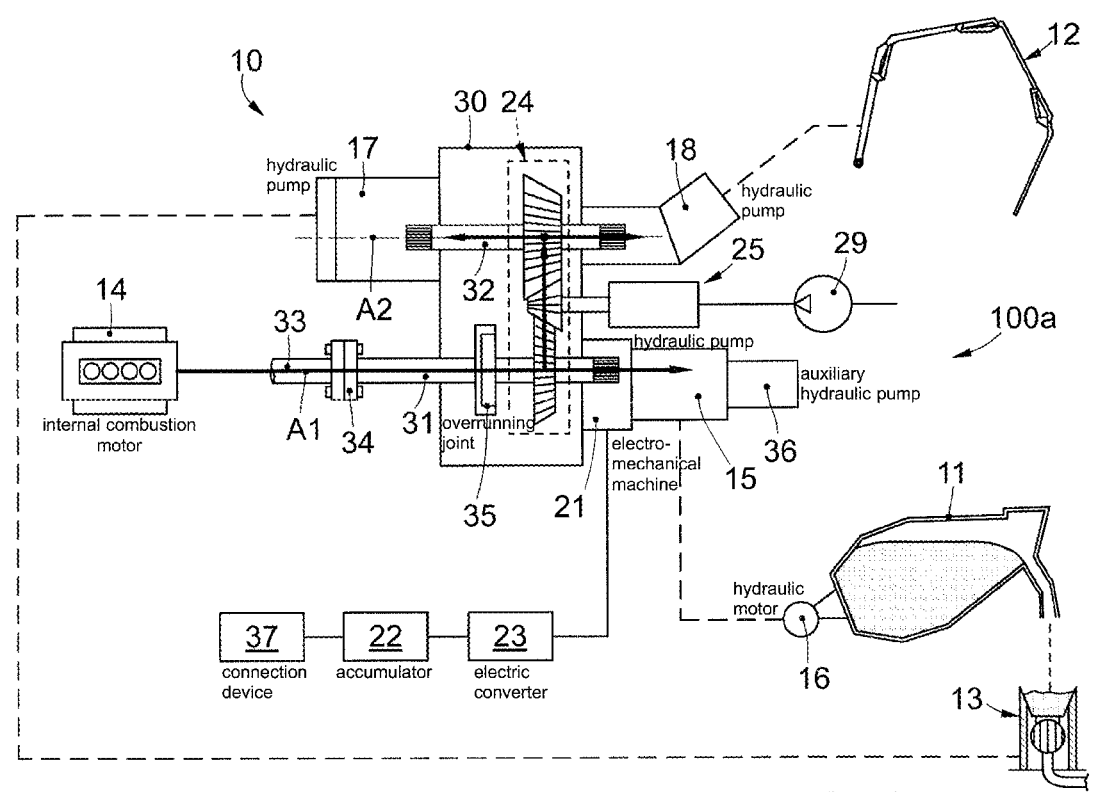
FIG. 4 is a schematic view of a second operating mode of the mobile operating machine only with an internal combustion endothermic motor.

FIG. 4 shows a direct operating mode by means of an internal combustion motor 14 of the mobile operating machine 100a which supplies the mechanical energy directly to the drive apparatus 10a to drive the respective hydraulic pumps 15, 17, 18 and possibly 36 connected to it.

This mode may not entail the use of the electromechanical machine 21 to generate the power necessary to operate the equipment, for example the drum 11, the articulated arm 12 or the pumping unit 13.

Figure 5:
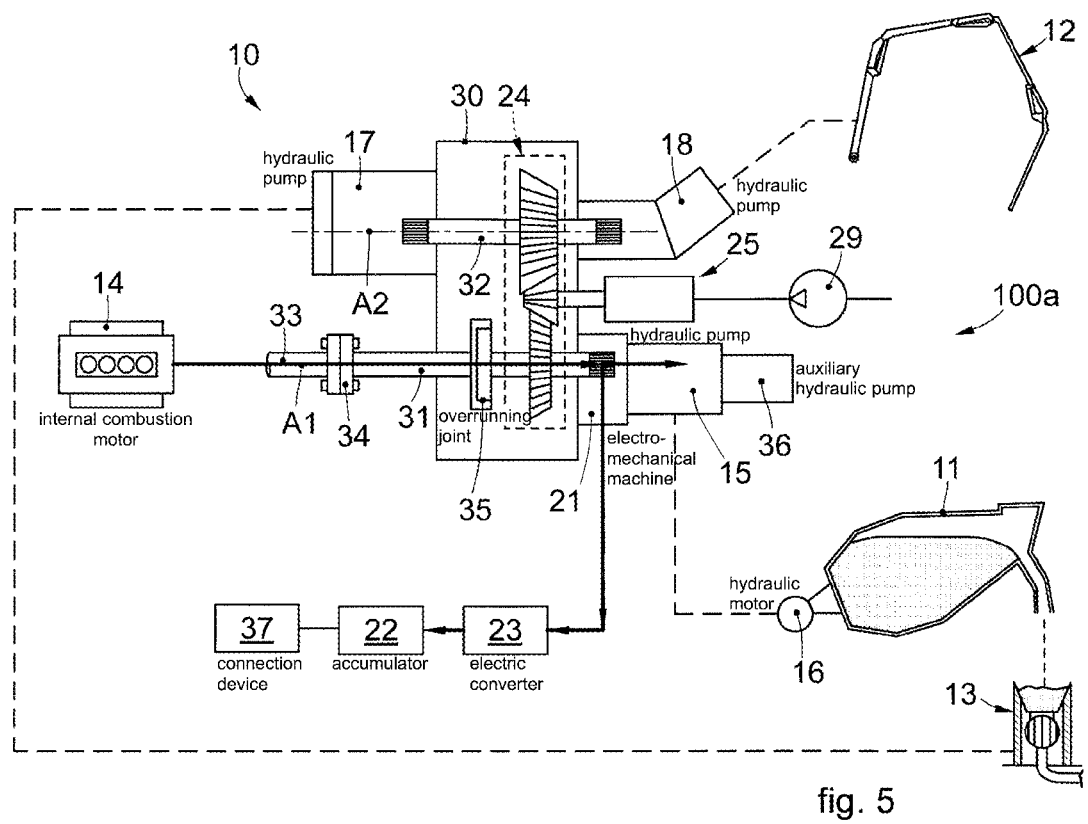
FIG. 5 is a schematic view of a third operating mode of the mobile operating machine on electric charge.

In FIG. 5, which can refer to an operating procedure of the mobile operating machine 100a with recharging on the road, part of the mechanical power coming from the internal combustion motor 14 and required for the motion of the motor vehicle is used to recharge the electric accumulator 22. In this step, therefore, the electromechanical machine 21 acts as an electric generator and supplies electric energy to the electric accumulator 22.

It can also be hypothesized that FIG. 5 refers to a situation of braking on the road. During the steps of braking on a road, part of the power used to generate the slowing down is recovered by means of the electromechanical machine 21. Substantially, therefore, during the braking step, part of the energy generated by the drawing of the internal combustion motor 14 is used by the electromechanical machine 21 for the purpose of recharging the electric accumulator 22.

Figure 6:
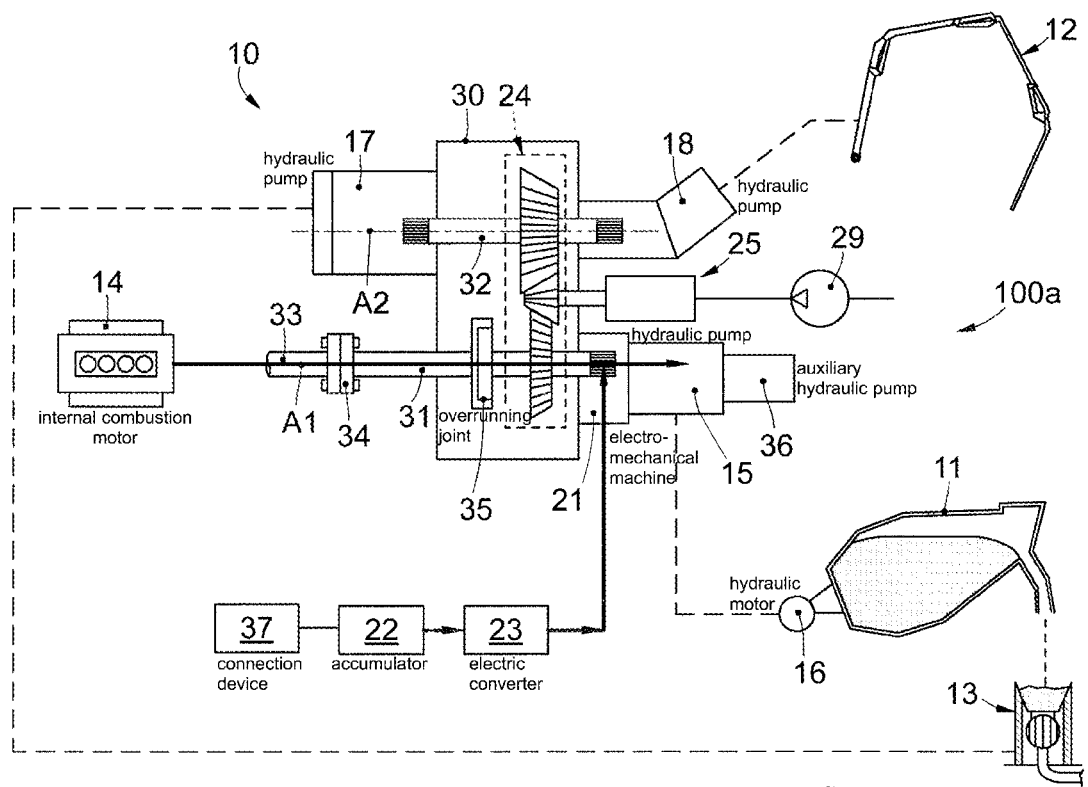
FIG. 6 is a schematic view of a further hybrid operating mode of the mobile operating machine.

FIG. 6 shows a hybrid operating mode of the present mobile operating machine 100a. In this mode, part of the power supplied to the drive apparatus 10a is generated by the internal combustion motor 14 of the motor vehicle, and part of the power is taken from the electric accumulator 22 and therefore produced by the electromechanical machine 21.

This possibility, advantageously, is allowed mainly by the fact that it is provided to connect the electromechanical machine 21 and the internal combustion motor 14 in axis with each other, that is, on the drive axis A1.

It is clear that modifications and/or additions of parts may be made to the drive apparatus of a mobile operating machine as described heretofore, without departing from the field and scope of the present invention.

Embodiments of the present invention can also concern a drive unit which comprises at least the first rotation shaft 31 provided at a first end with an elastic joint 34 to which the drive shaft 33 can be connected. The first rotation shaft 31 is also provided with a second free end equipped with a connection portion, such as a coupling, on which the electromechanical machine 21 can be connected.

The first rotation shaft 31 is equipped with a first shaft portion to which the elastic joint 34 is connected and a second shaft portion having the second end.

The first shaft portion and the second shaft portion are connected to each other by the free wheel 35, or overrunning joint.

Furthermore, the transmission device 24 configured to transmit the motion to the second rotation shaft 32 is connected on the second shaft portion.

The second rotation shaft 32 is provided with a first end to which the second hydraulic pump 17 can be connected and a second end, opposite the first end, to which the third hydraulic pump 18 can be connected.

The first and second end of the second rotation shaft 32 can be provided with connection portions, such as couplings, joints, grooved shafts, configured to allow the connection of the respective components.

It is also clear that, although the present invention has been described with reference to some specific examples, a person of skill in the art shall certainly be able to achieve many other equivalent forms of drive apparatus of a mobile operating machine, having the characteristics as set forth in the claims and hence all coming within the field of protection defined thereby.

What is claimed:

1. A drive apparatus suitable to drive a mobile operating machine, comprising a motor vehicle moved by at least one internal combustion motor, an articulated arm able to deliver concrete and a pumping unit configured to pump the concrete to said articulated arm, said drive apparatus wherein is comprised:

at least one hydraulic pump configured to pump a working fluid and to determine the drive of said pumping unit and at least one hydraulic pump configured to pump a working fluid and determine the drive of said articulated arm;

at least one electromechanical machine connected to said internal combustion motor, to said hydraulic pumps, and to an electric accumulator, the at least one electromechanical machine being configured to assume at least a first operating condition in which the at least one electromechanical machine converts the mechanical energy of said internal combustion motor into electric energy to be accumulated in said electric accumulator, and a second operating condition in which the at least one electromechanical machine converts the electric energy of said electric accumulator into mechanical energy to drive at least one of said hydraulic pumps;

at least a first drive axis along which said internal combustion motor and said electromechanical machine are positioned; and at least a second drive axis, adjacent and connected to said first drive axis by a transmission device, said hydraulic pumps being positioned on said second drive axis, at least another hydraulic pump configured to pump a working fluid and to determine the drive of a rotatable drum to mix the concrete, said at least another hydraulic pump being positioned on said first drive axis along which said internal combustion motor and said electromechanical machine are positioned, wherein said drive axes are parallel and said transmission device is positioned along a vertical axis (V).

2. The apparatus as in claim 1, wherein said transmission device comprises an activation member configured to selectively transmit the motion from said first drive axis (A1) to said second drive axis (A2).

3. The apparatus as in claim 1, wherein said apparatus comprises a containing body in which said transmission device is positioned and in which at least a first rotation shaft associated with said first drive axis (A1) and at least a second rotation shaft associated with said second drive axis (A2) are at least partly positioned.

4. The apparatus as in claim 3, wherein said internal combustion motor comprises a drive shaft connectable to said first rotation shaft by an elastic joint.

5. The apparatus as in claim 4, wherein said first rotation shaft is located in axis with said drive shaft, and said at least another hydraulic pump and said electromechanical machine are connected in axis on said first rotation shaft.

6. The apparatus as in claim 1, wherein said apparatus comprises at least one free wheel, or overrunning joint, positioned on said first drive axis and configured to allow the transmission of the motion of said internal combustion motor to said electromechanical machine and to prevent the transmission of the mechanical energy generated by said electromechanical machine toward said internal combustion motor when the latter is switched off, or when said internal combustion motor is in operation jointly with the electromechanical machine and they cooperate to supply power to said hydraulic pumps.

7. The apparatus as in claim 1, wherein an auxiliary hydraulic pump is positioned on said first drive axis (A1), in axis with said at least another hydraulic pump, said at least another hydraulic pump being configured to pump a working fluid and to determine the drive of said rotatable drum.

8. A mobile operating machine, comprising a motor vehicle moved by at least one internal combustion motor, an articulated arm able to deliver concrete and a pumping unit configured to pump the concrete to said articulated arm, said mobile operating machine further comprising a drive apparatus provided with:

- at least one hydraulic pump configured to pump a working fluid and to determine the drive of said pumping unit and at least one hydraulic pump configured to pump a working fluid and determine the drive of said articulated arm;
- at least one electromechanical machine connected to said internal combustion motor, to said hydraulic pumps, and to an electric accumulator, the at least one electromechanical machine being configured to assume at least a first operating condition in which the at least one electromechanical machine converts the mechanical energy of said internal combustion motor into electric energy to be accumulated in said electric accumulator, and a second operating condition in which the at least one electromechanical machine converts the electric energy of said electric accumulator into mechanical energy to drive at least one of said hydraulic pumps;
- at least a first drive axis (A1) along which said internal combustion motor and said electromechanical machine are positioned; and
- at least a second drive axis (A2), adjacent and connected to said first drive axis (A1) by a transmission device, said hydraulic pumps being positioned on said second drive axis (A2);
- at least another hydraulic pump configured to pump a working fluid and to determine the drive of a rotatable drum to mix the concrete, said at least another hydraulic pump being positioned on said first drive axis (A1) along which said internal combustion motor and said electromechanical machine are positioned,
- wherein said drive axes are parallel and said transmission device is positioned along a vertical axis (V).

* * * * *